Jan. 5, 1926.

C. E. SUMMERS 1,568,638

INTERNAL COMBUSTION ENGINE

Filed Oct. 27, 1921 5 Sheets-Sheet 1

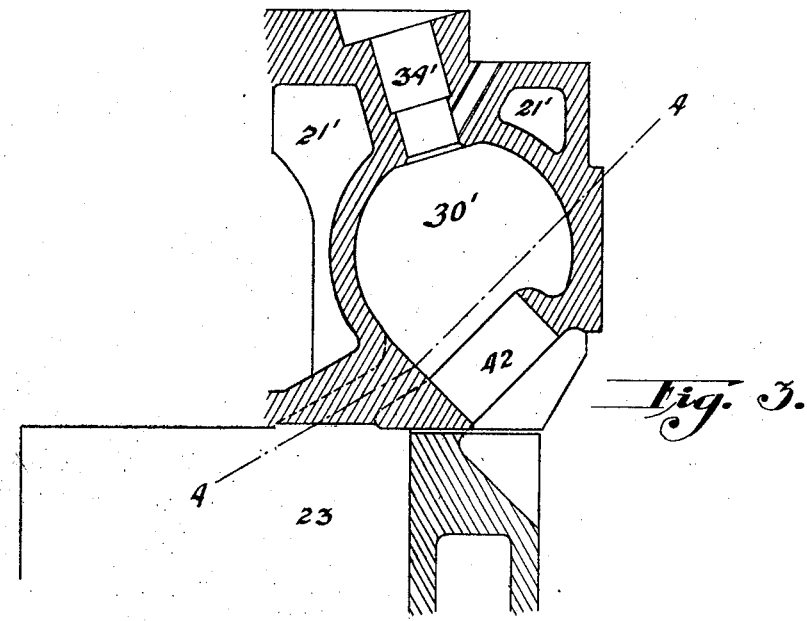
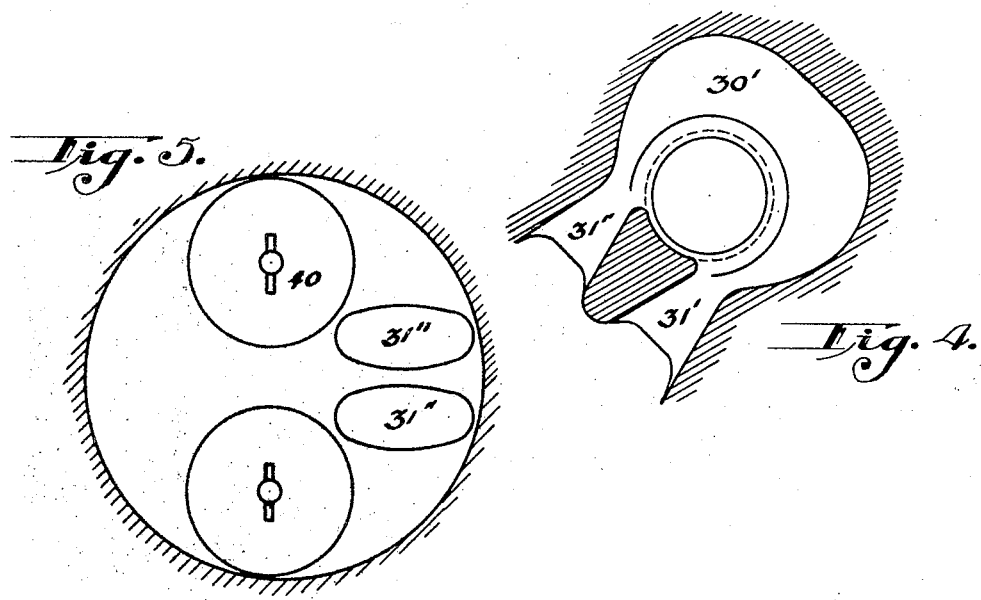

Jan. 5, 1926.  
C. E. SUMMERS  
INTERNAL COMBUSTION ENGINE  
Filed Oct. 27, 1921  
1,568,638  
5 Sheets-Sheet 5
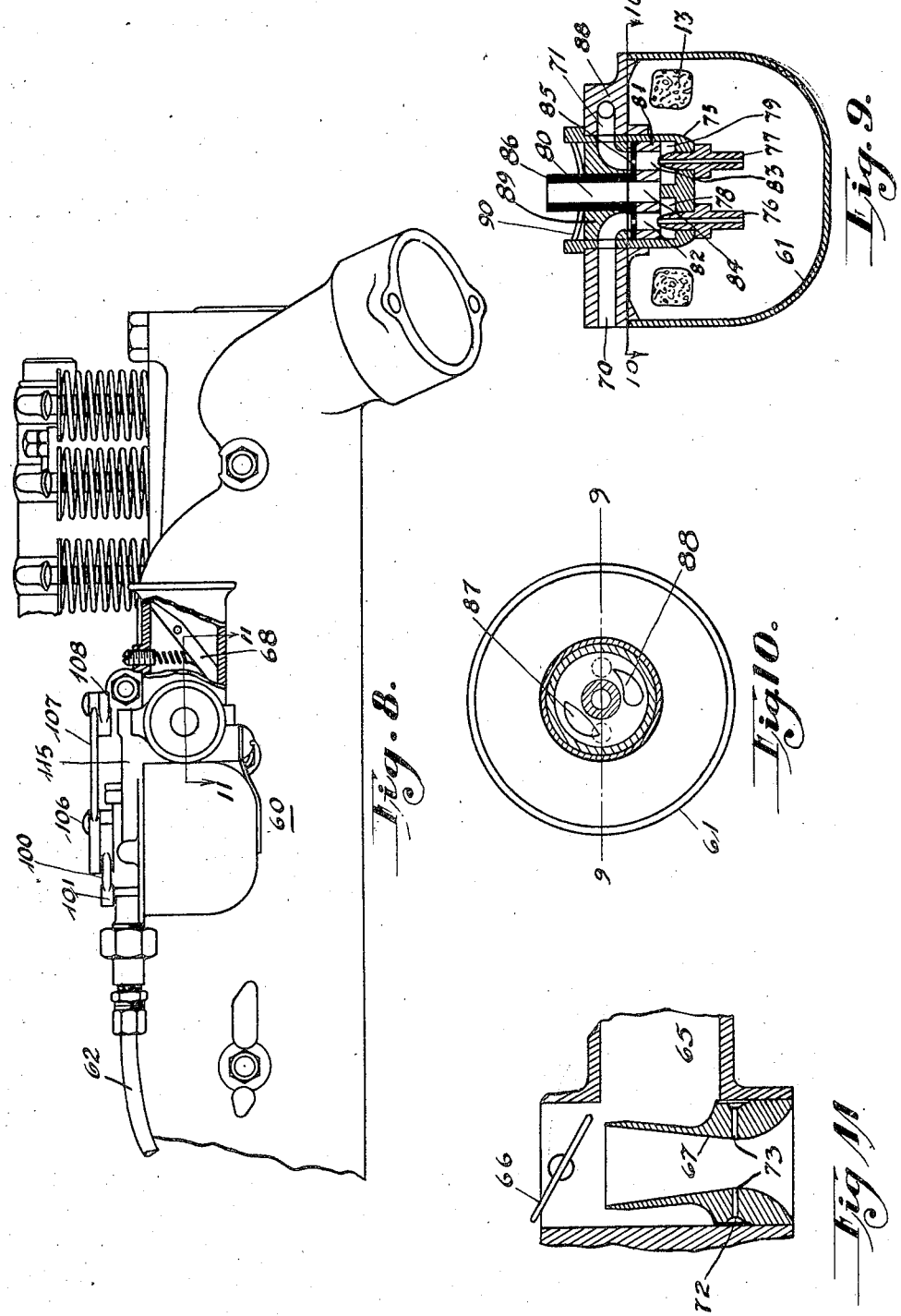
Witnesses  
R. Lee  
L. H. Emrick
Inventor  
Caleb E. Summers  
By Francis D. Hardesty  
Attorney Patented Jan. 5, 1926.

1,568,638

UNITED STATES PATENT OFFICE.

CALEB E. SUMMERS, OF DAYTON, OHIO, ASSIGNOR TO GENERAL MOTORS RESEARCH CORPORATION, OF DAYTON, OHIO, A CORPORATION OF DELAWARE.

INTERNAL-COMBUSTION ENGINE.

Application filed October 27, 1921. Serial No. 510,880.

*To all whom it may concern:*

Be it known that I, CALEB E. SUMMERS, a citizen of the United States of America, residing at Dayton, county of Montgomery and State of Ohio, have invented certain new and useful Improvements in Internal-Combustion Engines, of which the following is a full, clear, and exact description.

The present invention relates to improvements in internal combustion engines and methods of operating them, and, in the preferred form of embodiment, which has been chosen for the purpose of description and illustration, relates more particularly to Otto cycle engines.

Among the objects of the invention is to greatly increase the fuel economy of an engine and yet make provision for sufficient reserve power.

Another object is to greatly increase the efficiency of such engines by maintaining a substantially constant compression pressure over the greater portion of the load range.

Another object is to enable the combustion of a small volume of fuel in an amount of air greatly in excess of the amount required to form a combustible mixture with such volume of fuel.

Further objects and advantages of the present invention will be apparent from the following description, reference being had to the accompanying drawings, wherein a preferred form of embodiment of the present invention is clearly shown.

In the drawings:

Fig. 3 is a section similar to a portion of Fig. 1 but showing a modified form of chamber.

Fig. 4 is a section of the part shown in Fig. 3 along the line 4—4 thereof.

Fig. 5 is a view of the under side of the head of one cylinder showing the relative location of the several ports therein.

Fig. 8 is a side view of the upper part of the engine with parts omitted for clearness and showing particularly a form of carburetor suitable for the present purpose.

Fig. 9 is a vertical section through the carburetor float bowl and jets along the line 9—9 of Fig. 10, certain parts being omitted for clearness.

Fig. 10 is a horizontal section of the carburetor taken on the line 10—10 of Fig. 9.

Fig. 11 is a horizontal section along the line 11—11 of Fig. 8.

Figure 1:
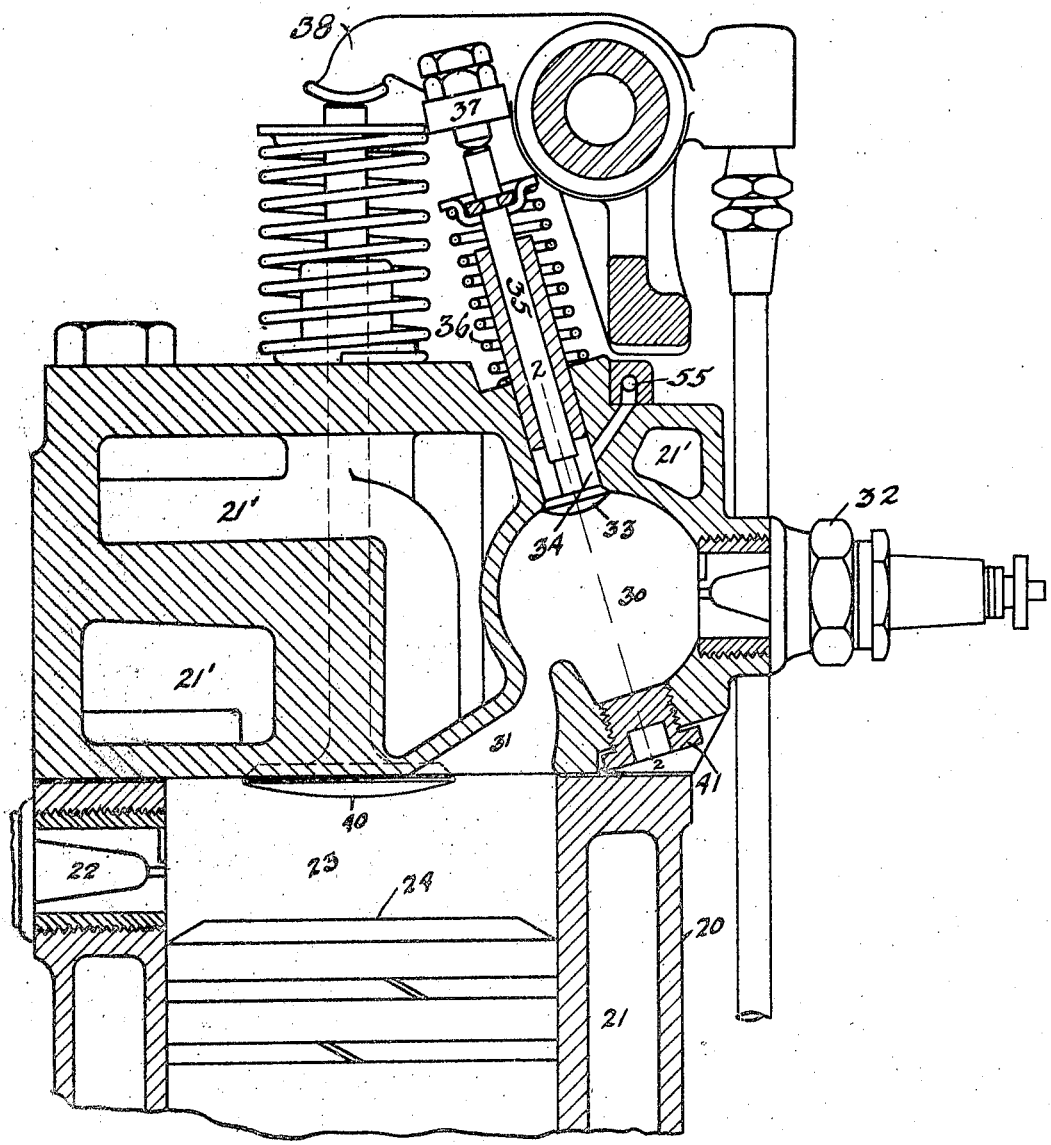
Fig. 1 is a vertical section through the head portion of an engine involving the invention, the section being taken along the line 1—1 of Fig. 6.
Figure 2:
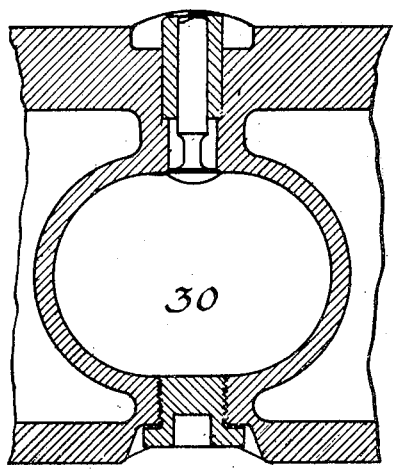
Fig. 2 is a section through the auxiliary chamber shown in Fig. 1, along the line 2—2 thereof.

In existing forms of four stroke cycle internal combustion engines the usual construction has a fixed size combustion chamber and is supplied with fuel from a carburetor adapted to mix air and fuel vapor or mist in substantially constant proportions, the proportions being usually kept between about one of fuel to fourteen of air and one of fuel to about eighteen of air, this being what might be considered broadly as an "efficient mixture." In many instances, carburetors are so arranged as to vary the proportions of fuel and air to some extent but the variation is over only a small range because of the fact that in existing engines a mixture containing less than one part by weight of fuel in about twenty parts by weight of fuel-air mixture, will not ignite from a spark, while a mixture having more fuel than one part by weight in about fourteen of air burns too slowly and is too wasteful, the latter being about the theoretical proportions for complete chemical combustion. While mixtures containing a less ratio of fuel to air than about one to twenty will not ignite with a spark, mixtures considerably leaner than this may be ignited with flame and of this fact advantage is taken in the present invention.

The only manner, therefore, of proportioning the fuel supplied to the desired power output, in the operation of ordinary engines, is to throttle the incoming mixture so as to permit to enter only a small proportion of the capacity of the engine cylinders.

The result of this throttling is to greatly reduce the pressure developed in the compression stroke and consequently greatly decrease the efficiency of the engine when operating under such conditions, as it is well recognized that higher compression gives greater efficiency.

In the present invention, a substantially full charge of working fluid is introduced under all running conditions so that full compression may be had.

Further, in the present invention, in order to decrease the power output, the supply of fuel is proportioned to the power output desired, while the supply of air remains nearly constant, means being provided whereby the ratio of fuel to air may be decreased to a considerably smaller one than that which is now considered possible, and yet have good ignition and combustion. In fact, it is possible with the present invention to operate with ratios, by weight, of one to forty and less, depending upon the exact construction used.

The above functions are accomplished by means of the form of engine illustrated as the preferred embodiment of the invention.

In this preferred embodiment, standard engine construction is used below the cylinder head and the desired functions obtained by modifying the cylinder head and fuel supply devices. From one aspect of the invention, therefore, it may be considered as being embodied in a cylinder head portion as an article of manufacture, which head portion is adapted to be applied to an existing engine in place of the head with which it is usual to construct it, such application involving no change whatever in the engine structure except the substitution of somewhat higher pistons to decrease the size of the main combustion chamber an amount equal to the capacity of the auxiliary chamber hereinafter described.

In the drawings, (Fig. 1) a standard engine cylinder is represented in section at 20, 21 indicating the water jacket and 22 indicating a spark plug projecting into the combustion chamber numbered 23. The piston is indicated at 24.

In the form shown, the engine is indicated as being provided with a removable head and this head involves certain modifications about to be described. It should be noted, however, that the invention is not limited to this type of engine as it applies equally well to engine cylinders with integral heads.

In the form of cylinder head shown there is provided a small chamber 30 communicating with the combustion chamber 23 through passage way 31, this passage way opening into the chamber 23 at one side thereof and opposite a point midway between the intake and exhaust valves, the former being indicated at 40.

Chamber 30, which is an auxiliary combustion chamber is also provided with a spark plug 32 projecting thereinto and an intake valve 33, adapted to open or close the intake passage 34, and provided with the usual stem 35, and valve spring 36.

This valve is operated by means of a small lateral arm 37 upon the rocker arm 38 for intake valve 40, the two valves 33 and 40 adapted to operate simultaneously.

Chamber 30 may also be provided with a screw plug 41 opposite to the valve 33 to permit removal or grinding of the latter.

A modified form of auxiliary chamber is shown in Figs. 3 and 4.

In this form, the chamber 30' communicates with the combustion chamber 23 through two passages 31' and 31" opening thereinto in the positions indicated in Fig. 5.

Chamber 30' is also provided with an opening 34' forming an intake passage and seat for a valve similar to passage 34 and valve 33 as shown in Fig. 1.

In chamber 30' however, instead of locating the spark plug as in Fig. 1, and having an additional plug 41 for allowing withdrawal of the valve, an opening 42 is provided, which opening serves for attaching the spark plug as well as permitting withdrawal of the valve. It will be noted that this opening 42 is located in such fashion as to have the spark plug electrodes (not shown) between the inner ends of passages 31' and 31" so that gases passing into or out of the passages do not pass directly over these electrodes.

In the form of head shown the passages for cooling water are indicated at 21'.

Figure 6:
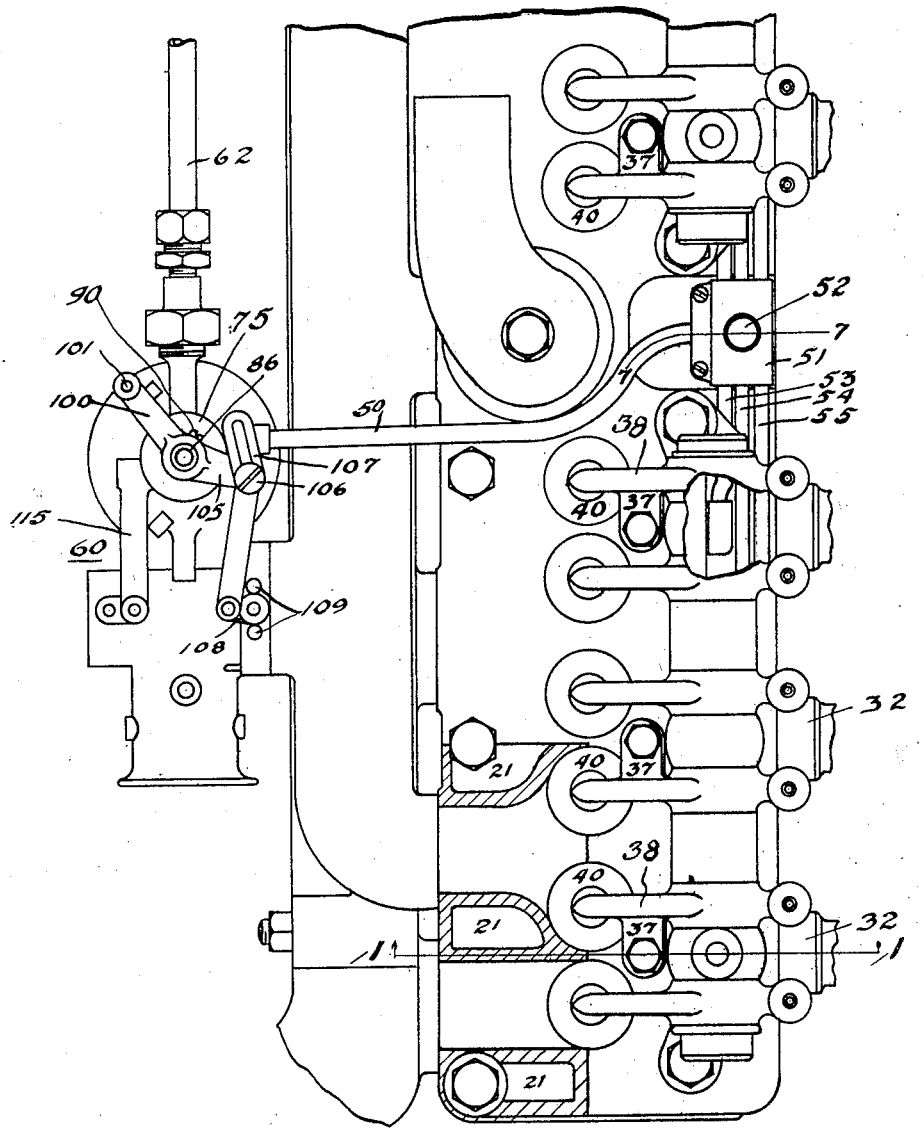
Fig. 6 is a plan of the head of the engine with parts in horizontal section.

Fig. 6 shows a plan of the cylinder head and is intended to show the manner in which fuel may be supplied to the chamber 30 or 30' of the several cylinders, the engine illustrated having 6 cylinders.

Figure 7:
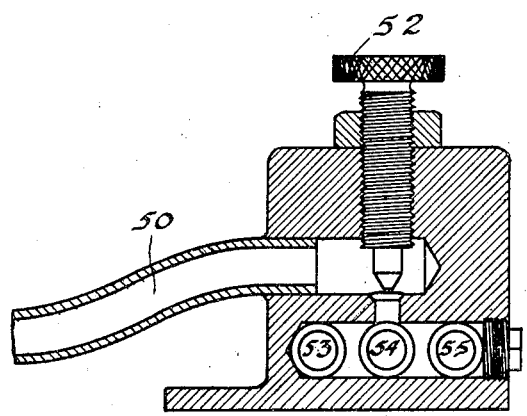
Fig. 7 is a sectional view of the intake pipe and header for supplying fuel mixture to the auxiliary chambers taken on line 7—7 of Fig. 6.

A fuel-air mixture of about one fuel to from about three to five of air is formed in the carburetor hereinafter described, and led therefrom through pipe 50 to a header 51. The opening into the header may or may not be controlled by means of a valve 52 for the purpose of controlling to some extent the gas velocities. From the header 51 there extend laterally of the header, but longitudinally of the engine, several tubes leading to the several cylinders. These tubes are shown in Figs. 6 and 7 and are numbered 53, 54 and 55. Tube 53 extends to the nearest cylinder, 54 to the next, and 55 to the end cylinder. The three cylinders at the other end being supplied in similar manner.

These tubes 53, 54 and 55 communicate with the auxiliary combustion chamber 30 of each cylinder respectively in the manner shown in Figs. 1 and 6.

The carburetor, of which use is made upon the present invention, is designed to furnish two distinct mixtures, one of these being supplied to tube 50 and so to the chambers 30, and the other being led directly into the standard intake manifold from which it passes through valves 40 to the main combustion chambers 23 of the respective cylinders.

The carburetor is clearly shown in Figs. 6 and 8 to 11 and, in the form shown, is of the horizontal feed type. It is designated as a whole by the numeral 60.

Carburetor 60, however, differs from the ordinary carburetor, in several respects because of the fact that it forms and controls two separate mixtures.

As in the ordinary form the present carburetor comprises a float bowl 61 supplied with fuel from a suitable source through pipe 62, the supply being controlled by a valve (not shown) operated by float 63.

The carburetor comprises also a T-shaped tube 65, one end of the cross-arm leading to the intake manifold and being provided with a butterfly throttle valve 66. The other end of the cross-arm of the T is venturi shaped and constitutes the main air inlet. In the form shown, a separate venturi-shaped member 67 has been inserted in the tube 65 and secured by suitable means, (not shown).

The stem of the T constitutes an auxiliary air inlet and is provided with a spring closed valve 68, this valve allowing admission of air, but restricting such admission so as to increase the velocity of flow through venturi 67.

The cover for the float bowl, besides the inlet for fuel, is provided with two passages 70 and 71, the first of which is connected to tube 50 and the second to an annular passage 72 around the venturi member 67. This passage 72 is connected by two or more passages 73 to the throat of the venturi 67 as shown in Fig. 11.

In the construction shown, the cover of the float bowl 61 is provided with a central opening into which fits a thimble 75 provided with openings in its bottom for the fuel jets 76 and 77.

In the form shown, the bottom of the thimble 75 is first bored for the fuel jets 76 and 77, then counterbored to form chambers 78 and 79 around the jets, these chambers extending far enough toward the center to open into a passage 80 allowing ingress of air for the primary mixture formed in said chambers.

Immediately above the jets 76 and 77 and supported upon the part of the thimble bottom not removed by the counterboring operation is a disc 81 provided with three passages 82, 83 and 84. The passages 82 and 83 are directly above and spaced from the jets 76 and 77 and the passage 84 is centrally located and large enough to extend over a portion of and therefore communicate with the two chambers 78 and 79.

Resting upon disc 81 is another disc 85 provided at its center with an opening around which is a tubular portion 86 which forms an extension to the atmosphere of passage 80.

Disc 85 is also provided with two other openings 87 and 88 of substantially the shape shown in Fig. 10, and is rotatable in a horizontal plane. The openings 87 and 88 are adapted to control the passage ways 70 and 71.

Disc 85 is held in place within thimble 75 by means of a suitable plug 89 and spring washer 90, the plug 89 being provided with suitable passages forming communications between passages 70 and 71, and 82 and 83 respectively.

The control of the carburetor is shown more clearly in Fig. 6.

In this figure, an arm 100 is shown as secured to tube 86 by means of a set screw, the outer end of the arm 101 being adapted to be connected by means of a suitable rod to a hand lever suitably located.

Also secured to tube 86 is a second arm 105, which in the construction shown is integral with arm 100 and carries at its outer end a screw 106 by means of which a sliding connection is established with link 107 forming operating means for throttle control arm 108. The movement of this arm 108 is limited by suitable stops 109. Arm 108 is attached to butterfly throttle valve 66, which is provided with a suitable spring tending to retain it in open position.

In Fig. 6, the connection between passage 71 and the annular passage 72 (Fig. 11) is shown as being through tube 115.

In the operation of the form of engine shown, for example, for idling, the throttle valve 66, arms 100 and 105, and disc 85 are set in the positions shown in Figs. 6, 10 and 11. In this position it will be noted that disc 85 is so positioned that a small amount of mixture is passing through passage 70 and tube 50 into the tubes leading to auxiliary combustion chambers 30, while substantially no fuel is passing through passage 71 to the main intake of the engine.

The result of this setting will be that upon the intake stroke of the piston only air will be drawn into chamber 23, while a small amount of a fairly rich mixture will be taken into chamber 30.

Upon the closing of the two intake valves 40 and 33 and the compression stroke of the piston, a portion of the air from chamber 23 will be forced into chamber 30, diluting the rich mixture therein to a degree suitable for proper combustion.

The compressed mixture in chamber 30 is then fired by means of spark plug 32, whereupon the hot exhaust gases with some flame will rush through opening 31, heating the air therein so that the entire quantity of gas in the total combustion chamber will be expanded, thus producing the power impulse.

Upon operating the throttle control lever to produce more power or speed, the arm 100 is moved counterclockwise, carrying with it the disc 85. This movement, it will be noted, causes rapid opening of passage 70 and a very much slower opening of passage 71 on account of the shape of openings 87 and 88 (see Fig. 10). At the same time on account of its spring, the butterfly valve 66 will open until, with about 40% of the movement of arm 105, it becomes wide open and will remain so doing the balance of the movement of arm 105.

The movement of arms 100 and 105, will, besides that function just mentioned, rapidly increase the amount of mixture admitted to chamber 30 until about one half of said movement has been completed and further movement will as rapidly decrease such admission.

At the same time, opening 88 will be increased slowly, the rate of increase being also increased until the end of the throw of arm 100 when it will have reached its maximum.

Opening 87 will by that time be substantially closed and the engine will be operating as a normal engine, that is, it will be receiving its charge in the normal may through the intake valve 40.

It should be noted that instead of the form of double carburetor herein described any suitable form may be used provided it can be controlled in the manner indicated, there may be substituted even, two separate carburetors if they are properly regulated and linked together in such manner as to produce the required results.

Further is should also be noted that while the form of mechanism herein shown and described constitutes a preferred form of embodiment of the present invention, it is to be understood that other forms might be adopted, all coming within the scope of the claims which follow.

What I claim is as follows:

1. The method of operating an internal combustion engine which comprises supplying to each of the cylinders thereof at one portion, a charge varying from air, at and under about eighth load, to an efficient fuel air mixture at full load, while simultaneously supplying to another portion of the cylinders an efficient fuel air mixture, and igniting the latter.

2. The method of operating an internal combustion engine which comprises supplying to each of the cylinders thereof at separate points and simultaneously, two fuel air mixtures, one of the mixtures varying in composition from air to efficient mixture, the other of the mixtures remaining substantially constant in composition, and igniting the latter.

3. The method of operating an internal combustion engine which comprises supplying to a cylinder thereof at light load a charge of air; simultaneously supplying thereto an ignitable fuel-air mixture in such fashion as to keep the air and mixture substantially segregated; adding fuel to the incoming air charge in proportion to load increase; compressing the total charge; and igniting the said mixture.

4. The method of operating an internal combustion engine which consists of delivering to each cylinder in successive cycles charges of substantially equal volumes of combustible working fluid in segregated portions, successively compressing said charges, varying the power output by varying the fuel content of at least one of the segregated portions while maintaining the other portion sufficiently rich in fuel to be ignited by a spark and igniting, after compression, the last named portion of the charge.

5. In an internal combustion engine, means for supplying to the cylinders thereof two fuel-air charges with means for varying the composition of one of the charges from air alone to an efficient fuel-air mixture while the other remains substantially fixed in composition; means for retaining the two charges substantially segregated during compression; and means for directly igniting the said other charge.

6. In an internal combustion engine a cylinder having an intake and an exhaust valve and igniting means and also having a combustion chamber therein; an auxiliary combustion chamber smaller than and communicating with the first mentioned chamber, the auxiliary chamber being provided with an inlet valve and igniting means; means for operating both the inlet valves simultaneously; means for supplying a separate mixture to each of the chambers; and means for varying the proportion of fuel in the mixture supplied to the first mentioned combustion chamber.

7. As an article of manufacture, a detachable head portion for multicylinder internal combustion engines, comprising a cylinder head block provided with intake and exhaust ports for the cylinders; valves for the said ports; an auxiliary combustion chamber in the head and open to that face of the block adapted to form a wall of the main combustion chamber; intake means for the auxiliary chamber, including a valve; means for actuating all of the valves; means for supplying separate charges of working fluid to said intake port and said intake means; and means for igniting at least one of said charges.

8. As an article of manufacture, a detachable head portion for multicylinder internal combustion engines, comprising a cylinder head block provided with intake and exhaust ports for the cylinders; valves for the said ports; an auxiliary combustion chamber in the head and open to that face of the block adapted to form a wall of the main combustion chamber; means for passing cooling fluid into contact with the outer walls of the ports and chambers; intake means for the auxiliary chamber, including a valve; means for actuating all of the valves; means for supplying separate charges of working fluid to said intake port and said intake means; and means for igniting at least one of said charges.

9. As an article of manufacture, a detachable head portion for an internal combustion engine cylinder, the said head portion including an intake port and valve; said head portion also including an auxiliary combustion chamber provided with intake means and a valve therefor; means for operating both said valves simultaneously; and means for supplying different working fluid charges through the two valves.

10. In an internal combustion engine, a cylinder structure providing, with the piston, a main combustion chamber having valved intake and exhaust ports, communicating therewith and an igniting means therein; and an auxiliary combustion chamber having restricted communication with the main combustion chamber, a valved inlet communicating with the auxiliary chamber and igniting means within said auxiliary chamber.

In testimony whereof I hereto affix my signature.

CALEB E. SUMMERS.